(No Model.) 3 Sheets—Sheet 1.
W. B. HUMPHREY.
COMBINATION LOCK.
No. 526,709. Patented Oct. 2, 1894.
Fig. 1. Fig. 2.
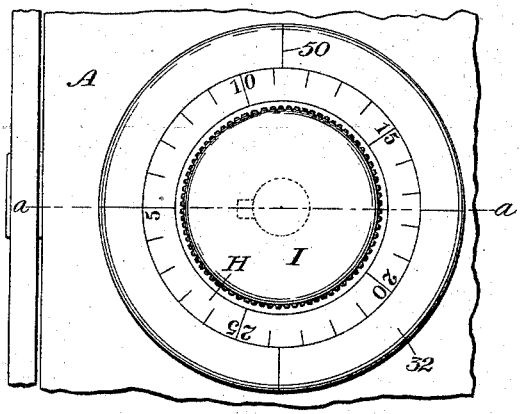
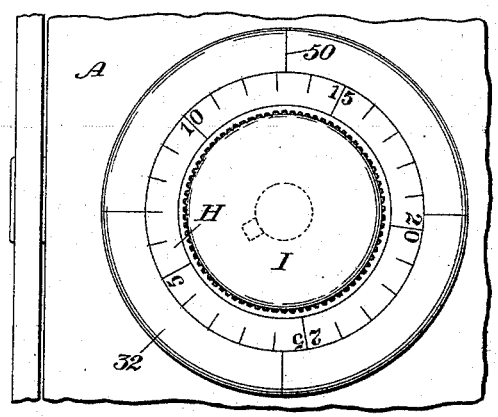
Fig. 3. Fig. 4. Fig. 5.
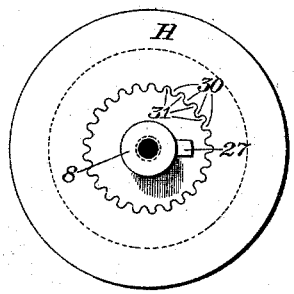
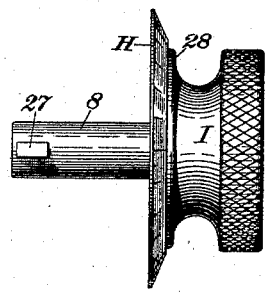
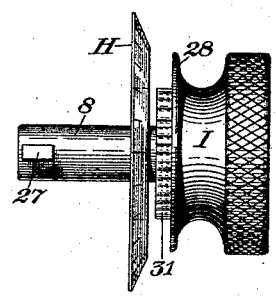
Fig. 6. Fig. 7. Fig. 8. Fig. 9.
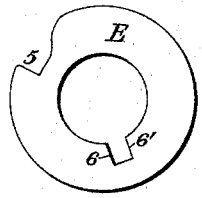
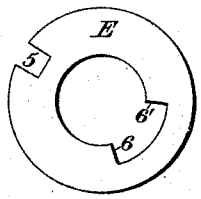
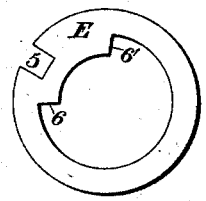
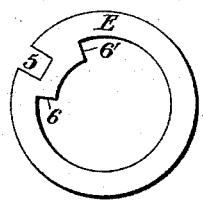
Witnesses:
J. L. Edwards Jr.
Fred. J. Dole.
Fig. 10.
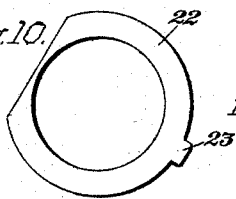
Inventor:
Walter B. Humphrey,
By his Attorney,
F. A. Richards (No Model.) 3 Sheets—Sheet 2.
W. B. HUMPHREY.
COMBINATION LOCK.

No. 526,709. Patented Oct. 2, 1894.

Witnesses:
J. L. Edwards Jr.
Fred. J. Dole.

Inventor:
Walter B. Humphrey,
By his Attorney,
F. N. Richards (No Model.) 3 Sheets—Sheet 3.
W. B. HUMPHREY.
COMBINATION LOCK.
No. 526,709. Patented Oct. 2, 1894.
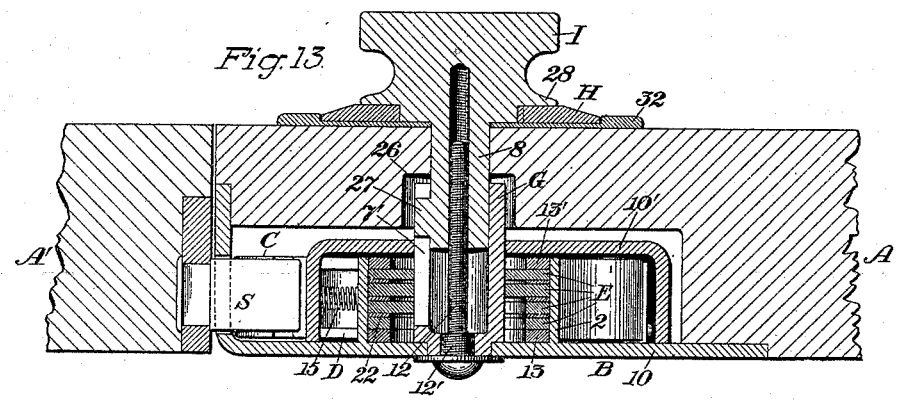
Fig. 13.
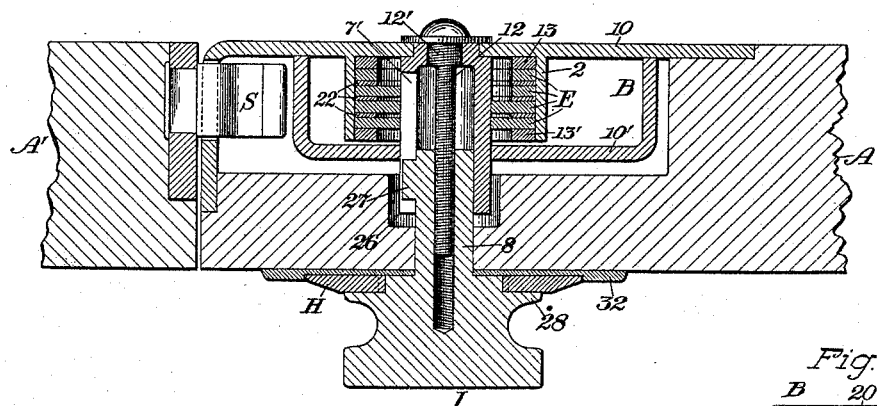
Fig. 14.
Fig. 19. Fig. 17. Fig. 22.
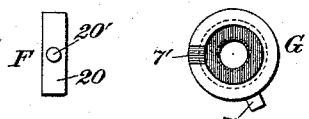
Fig. 20. Fig. 18. Fig. 21.
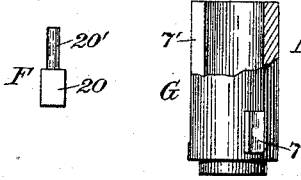
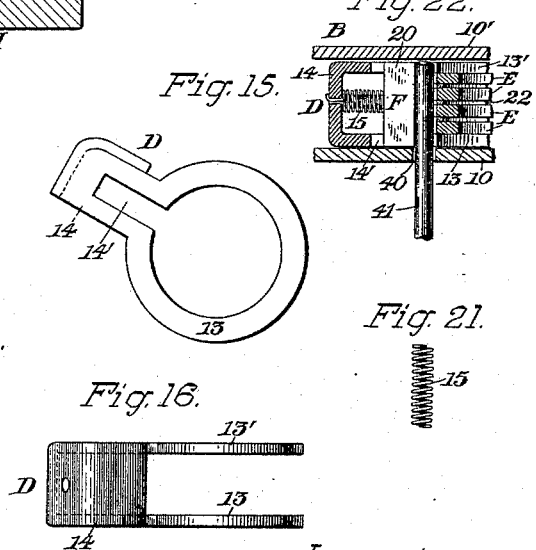
Fig. 15. Fig. 16.
Witnesses:
J. L. Edwards Jr.
Fred. J. Dole.
Inventor:
Walter B. Humphrey,
By his Attorney,
F. H. Richards

UNITED STATES PATENT OFFICE.

WALTER B. HUMPHREY, OF WINDSOR, CONNECTICUT, ASSIGNOR OF THREE-TENTHS TO JAMES BEVAN, OF SAME PLACE.

COMBINATION-LOCK.

SPECIFICATION forming part of Letters Patent No. 526,709, dated October 2, 1894.

Application filed March 10, 1894. Serial No. 503,209. (No model.)

*To all whom it may concern:*

Be it known that I, WALTER B. HUMPHREY, a citizen of the United States, residing at Windsor, in the county of Hartford and State of Connecticut, have invented certain new and useful Improvements in Combination-Locks, of which the following is a specification.

This invention relates to that class of locks known as "combination-locks," the object of the invention being to produce a lock which will preclude the possibility of "picking" and which shall be simple, cheap and durable in construction, easily operated by those acquainted with the combination, and in which the reading of the combination may be quickly changed without disassembling the parts of the lock; also to provide means whereby the combination may be ascertained after the parts are assembled, as will be hereinafter fully described.

Figure 11:
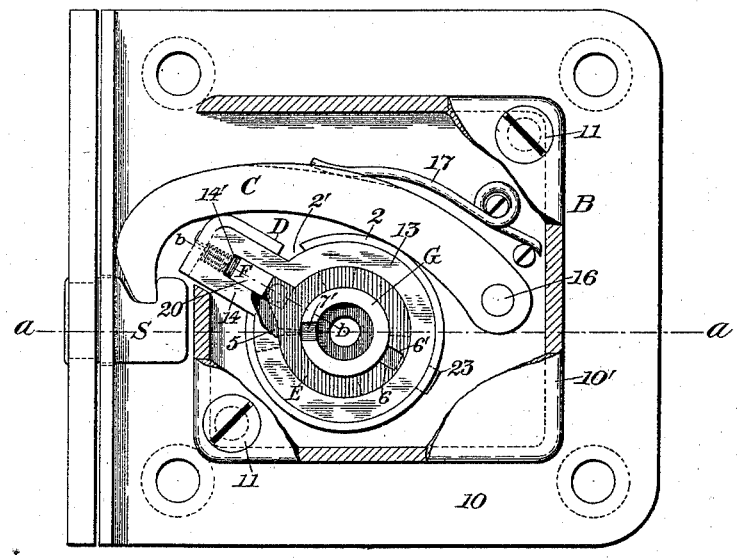
Figure 12:
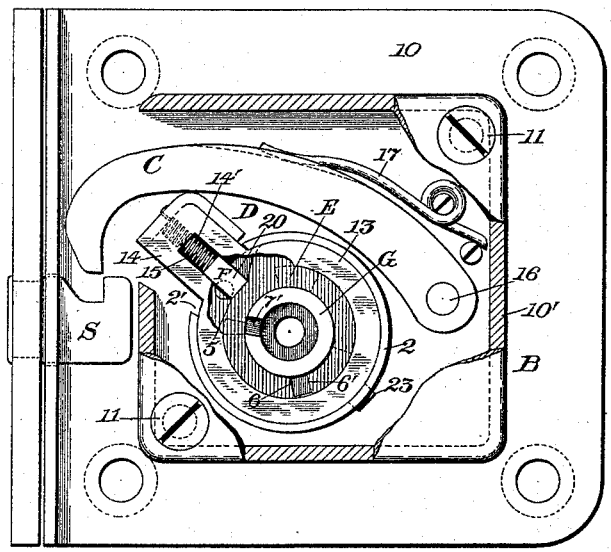

In the drawings accompanying and forming a part of this specification, Figures 1 and 2 are front views of my improved lock as applied to two members which it is desired to lock together, said figures showing the dial-plate and knob in different positions. Fig. 3 is a rear view of the dial-plate and knob-stem connected together, said figure showing the corrugated rim of the knob in engagement in the corrugated opening in the dial-plate. Fig. 4 is a side view of the dial-plate and knob in their engaged position. Fig. 5 is a similar side view showing the knob as disengaged from the dial-plate. Figs. 6, 7, 8 and 9 are side views of the several tumblers, said figures showing the several tumblers as set side by side in the position they occupy relatively to each other when the lock-notches thereof are in alignment and in position for retracting the bolt. Fig. 10 is a side elevation of one of the washers which is interposed between two tumblers to prevent the movement of one tumbler affecting another. Fig. 11 is a front elevation of the lock mechanism, a portion of the casing being broken away to show the operative details more clearly, said figure showing the parts in their normal, or locked position. Fig. 12 is a front elevation, similar to Fig. 11, showing the parts in their unlocked position and the bolt as retracted by the bolt-actuator. Fig. 13 is a cross-sectional view of the lock-mechanism taken in line *a—a*, Figs. 1 and 11, looking from below in said figures. Fig. 14 is a similar cross-sectional view taken on the same lines in Figs. 1 and 11, looking from above in said figures. Figs. 15 and 16 are front and side views, respectively, of the bolt-actuator. Fig. 17 is an end view of the tumbler-actuating spindle. Fig. 18 is a side elevation of the same, partially in section. Figs. 19 and 20, are end and side views, respectively, of the tumbler-engaging dog. Fig. 21 is a side view of the dog-actuating spring. Fig. 22 is a sectional view of a portion of the casing and tumbler-carrying actuator, taken in line *b—b*, Fig. 11.

Similar characters designate like parts in all the figures.

Briefly stated, my improvements comprise, in combination, a casing, B, having a laterally projecting tumbler-carrier bearing, 2, open at one side thereof; a lock-bolt, C, supported at one side of said bearing; an axially recessed tumbler-carrying bolt-actuator, D, journaled in said bearing and having a peripheral projection, 14, in position and adapted for engaging the bolt; a series of centrally-recessed discous tumblers, or dials, E, having peripheral lock-notches, 5, and having internal actuator-abutment faces, 6, differently disposed relatively to each other; a spring-actuated tumbler engaging bolt or dog, F, in sliding engagement with the lock-bolt-actuator and in position and adapted for engagement with the peripheral notches of the tumblers when said notches register one with the other and are in alignment with the tumbler-bolt; a tumbler-actuator or spindle, G, extended through the tumblers and having a lateral projection, 7, adapted for engaging the abutment faces of said tumblers; a recessed dial-plate, H; a knob, I, having a stem extended through said dial-plate and having projections, one of which is adapted for engagement with the tumbler-actuating sleeve, and the other of which is adapted for shiftably engaging the dial-plate, and means for adjustably securing the knob in position and for adapting the lock for use with doors or other members of different thicknesses, all of which will be hereinafter fully described.

In the drawings, I have shown my improved lock as applied to sliding doors, A and A', such as are frequently used in book-cases, cabinets, &c.

The casing B which confines the working-parts of the lock, is herein shown as consisting of a flanged face-plate, 10, secured to the door A by suitable screws, and the flanged inner plate, or cap, 10', which is secured (when the parts are assembled therein) to the face-plate by suitable screws, 11. These two plates, or members, of the casing, together with the door A, have transverse recesses in axial alignment one with the other to receive the knob-stem 8 of the knob I and the screw-bolt 12 which adjustably secures said knob in place. The casing B is provided at its interior with an annular flange, 2, which is open at one side, as shown at 2', and constitutes a tubular bearing in which the bolt-actuator D and the several tumblers E carried thereby are journaled.

In the preferred form thereof herein shown, the bolt-actuator D which also constitutes a tumbler-carrier, consists of two remotely-disposed preferably resilient and concentric rings, 13 and 13,' respectively, which form the journal or body-portion of the actuator, and also constitute retaining walls for holding the tumblers *en masse* in the body-portion of the actuator. This body-portion has a radial extension, 14, at one side thereof which is recessed, as shown at 14', which recess communicates with the interior of the rings and forms a housing and guide for the tumbler engaging bolt F and its actuating spring 15.

In the drawings, I have shown the bolt C as a swinging bolt pivoted at its rear end, as shown at 16, to the face-plate 10 of the casing at one side of the tumbler-bearing 2 and as normally held in its locking position by means of a spring, 17, bearing upon the upper edge thereof, but it is obvious, however, that any suitable bolt, as for instance, a sliding bolt, might be employed in connection with the actuator D without departing from my invention.

In the preferred form thereof herein shown, the tumblers E, (shown as four in number) are in the nature of concentric rings, each having a lock-notch, 5, formed in the periphery thereof, and each having two remotely-disposed radial abutments 6 and 6' at the inner edge thereof. The distance between the abutments of each successive tumbler differs from that of the one adjacent thereto, as also do the positions thereof with relation to the lock-notch differ from those of the succeeding tumblers. In practice, the distance between the abutment-faces 6 and 6' of the first tumbler of the series will be within the limits of the abutments of the next adjacent tumbler, and so on throughout the series, constituting, when the tumblers are assembled in their operative position, a nest of abutments whose faces lie one within the other. The positions of the abutments of the several tumblers with relation to their respective lock-notches, and with relation to the abutments of the successive tumblers, determine the operative combination of said tumblers, the particular combination thereof being provided for in constructing the several tumblers. Seated in the recess 14' of the extension 14 of the actuator, is a tumbler-engaging bolt, F, whose inner end is adjacent to the peripheries of the tumblers. This tumbler-bolt will preferably comprise a head, 20, and a reduced stem, 20', as shown in Figs. 19 and 20 of the drawings. This bolt is normally retained in engagement with the peripheries of the tumblers by means of a spring, 15, interposed between the head thereof and the outer end of the extension 14 of the bolt-actuator, as clearly shown in Figs. 11 and 12.

The tumbler-actuator G in the form thereof herein shown, is in the nature of a sleeve recessed at one side, as shown at 7', and which is of an external diameter approximating the internal diameter of the several tumblers, and is adapted to be extended therethrough, as shown in Figs. 13 and 14 of the drawings, said sleeve being provided at one side thereof with a projection, 7, which extends between and is adapted to engage the abutments of the several tumblers E.

In practice, the tumbler-carrier, which also constitutes the lock-bolt-actuator, will be so constructed of resilient metal as to impinge the tumblers carried thereby between the rings 13 and 13', which constitute the body-portion thereof. Interposed between the tumblers are the washers 22, each of which will preferably have a peripheral projection, 23, which extends through a slot formed in one side of the tumbler bearing 2, which holds said washers against rotation during the rotation of the several tumblers.

By constructing the tumbler-carrier of resilient metal, as described, the tumblers, when assembled within said carrier, are impinged between the rings 13 and 13' thereof which not only hold them in place laterally, but prevent any accidental rotation thereof relative to each other.

The projection 7 of the tumbler-actuator is of sufficient length to engage between abutments of the entire series of tumblers, and has its outer end reduced to extend through the recess in the face-plate and have a bearing against the inner side of said plate. The recess 7' at one side of the tumbler-actuator, will extend, in practice, from the extreme inner end thereof approximately the entire length of said actuator to permit of a longitudinal adjustment therein of the stem, 8, which engages and rotates said actuator as is necessary when applying the lock to doors, panels, or other members of varying thicknesses. The stem 8 which extends through a recess, 26 formed in the face of the door or member A opposite that to which the face-plate 10 is secured, and has its inner end projected into the tumbler-actuator G, as shown in Figs. 13 and 14, has a lateral projection, 27, which engages in the recess 7' in said actuator, said stem having a knob, I, at the outer end thereof which has an annular flange, 28, that bears against the outer face of the dial-plate H, which dial-plate is centrally recessed and is provided with corrugations, 30, at the inner edge thereof adapted to be engaged by similar corrugations, 31, upon the inner end of the knob I. This dial-plate is seated in an annular recess formed in the front face of an escutcheon-plate, 32, secured to the face of the door, as shown in Figs. 13 and 14, and will be provided upon its outer edge with indicating characters by means of which to read the combination of the lock. The knob I is held in close engagement with the door, irrespective of the thickness thereof, by means of the adjusting-screw 12 which is screwed through the outer end of the tumbler-actuator and is screwed into a screw-threaded opening formed in the stem of said knob, the shank of said screw, contiguous to the head, thereof, being preferably enlarged and screw-threaded as shown at 12' and screwed into the outer end of the tumbler-actuator, thus firmly holding the actuator and knob against longitudinal movement, and also permitting longitudinal adjustment of one with relation to the other to adapt the lock to doors of varying thicknesses which is a matter of great consideration.

By making the knob longitudinally adjustable with relation to the tumbler-actuator, and providing means in connection therewith, for engagement with the dial-plate, as hereinbefore described, I am enabled to quickly change the reading of the combination of the lock without disassembling the parts thereof by simply moving the knob by means of the screw 12 outward out of engagement with the dial-plate H, shifting said dial-plate to bring a different character thereon contiguous to the indicating mark 50 on the escutcheon-plate, and re-engaging the head with said dial-plate by tightening the screw 12.

As a means for ascertaining the reading of the combination after the parts of the lock are assembled without disassembling said parts, I have formed in the back-plate, or face-plate 10, a pin-hole, 40, which extends through said plate and lies in the path of movement of the lock-notches of the tumblers and in alignment with the tumbler-engaging bolt F, as most clearly shown in Fig. 22. When it is desired to ascertain the reading of the combination, assuming the parts to be in the position illustrated in Fig. 11, a pin, 41, will be extended through the pin-hole 40 bearing at its inner end against the adjacent face of the inner tumbler of the series, after which the knob I will be turned until the lock-notch of said tumbler comes into alignment with the pin, when said pin will pass into the lock-notch of said tumbler and then bear against the face of the next adjacent tumbler. The reading of the dial-plate will then be marked down, and the knob again turned in the opposite direction until the pin enters the lock-notch of this adjacent tumbler when the reading of the dial will again be taken, this operation being repeated until the pin projects through the entire series of tumblers, when upon the withdrawal of said pin the tumbler-bolt F will enter the lock-notches of the tumblers and the parts will be in position to throw the bolt. This, of course, can only be accomplished when the door to which the lock is applied is open and the catch S secured to the other door is not in engagement with the bolt.

Another important feature of my present invention is the provision for assembling the tumblers in the carrier D and securing the thole *en masse* in the journal 2 of the casing in their operative positions, which greatly facilitates the adjustment and assembling of the parts.

The sleeve G, hereinbefore referred to as the tumbler-actuator, and the knob I and its stem constitute, practically, a composite-spindle, comprising two members adjustably connected together and adapted for carrying the dial-plate H and for rotating the tumblers.

Having thus described my invention, I claim—

1. In a combination lock, the combination with a casing having a tumbler-carrier bearing and with the lock-bolt located at one side of said bearing, of a tumbler-carrying bolt-actuator journaled in said bearing, a series of peripherally-notched concentric tumblers carried in said carrier, a spring-actuated tumbler-engaging bolt normally bearing against the peripheries of said tumblers and in position for engagement with the lock-notches thereof, and an adjustable spindle in engagement with and adapted for actuating said tumblers, substantially as described.

2. In a combination-lock, the combination with a casing having a tumbler-carrier bearing and with the lock-bolt located at one side of said bearing, of a tumbler-carrying bolt-actuator journaled in said bearing, a series of concentric tumblers carried in said actuator and having peripheral lock-notches, a composite-spindle comprising two members adjustably connected together by means of a screw-bolt, substantially as described, and engaging said tumblers, and a spring-actuated tumbler-engaging bolt normally bearing against the peripheries of said tumblers and in position for engagement with the lock-notches thereof, substantially as described and for the purpose set forth.

3. In a combination-lock, a casing having a tumbler-carrier bearing open at one side thereof, and a lock-bolt located at one side of said bearing, in combination with a tumbler-carrying bolt-actuator having an annular body-portion journaled in said bearing and having a lateral extension extended through said bearing, a series of tumblers carried by said actuator, and means for engaging and rotating said tumblers, substantially as described.

4. In a combination-lock, a casing having a tumbler-carrier bearing substantially as described, in combination with a lock-bolt located at one side of said bearing, a combined bolt-actuator and tumbler-carrier journaled in said bearing and carrying a series of discous tumblers having peripheral lock-notches and internal abutment-faces, a spring-actuator tumbler-engaging bolt carried by the bolt-actuator in position for engagement with the lock-notches of said tumblers, and means for rotating said tumblers, substantially as described and for the purpose set forth.

5. In a combination-lock, the combination with a casing having a tumbler-carrier bearing and with the lock-bolt located at one side of said bearing, of a tumbler-carrying bolt-actuator journaled in said bearing, a series of tumblers carried thereby, a bolt in connection with said actuator and adapted for engagement with said tumblers, a dial-plate, and a composite spindle comprising two members adjustably secured together and adapted for carrying the dial and for rotating the tumblers, substantially as described and for the purpose set forth.

6. In a combination-lock, the combination with the casing having a tumbler-carrying bearing, and with the lock-bolt located at one side of said bearing, of a tumbler-carrying bolt-actuator journaled in said bearing and comprising two resilient rings adapted for impinging a series of disks carried between said rings and having a lateral extension in position and adapted for engagement with the lock-bolt, discous tumblers carried between the rings of said actuator, and means for rotating said tumblers, substantially as described.

7. In a combination-lock, the combination with the casing having a tumbler-carrying bearing, and with the lock-bolt located at one side of said bearing, of a tumbler-carrying bolt-actuator journaled in said bearing and comprising two resilient rings adapted for impinging a series of disks carried between said rings and having a lateral extension in position and adapted for engagement with the lock-bolt, a series of centrally-recessed discous tumblers carried between said rings and having peripheral lock-notches and internal radial abutments, a spring-actuated tumbler-engaging bolt carried by said actuator in position for engaging the lock-notches of the tumblers, and a spindle for rotating said tumblers, substantially as described and for the purpose set forth.

8. In a combination-lock, the combination with the casing having a tumbler-carrying bearing and with the lock-bolt located at one side of said bearing, of a tumbler-carrying bolt-actuator journaled in said bearing, a series of centrally-recessed tumblers carried by said actuator and having peripheral lock-notches and internal abutments, a sleeve or tumbler-actuator extended through the recesses of said tumblers and having a lateral projection adapted for engaging the abutments of the tumblers, a tumbler-engaging bolt carried by the actuator in position for engaging the peripheral notches of the tumblers, a recessed dial-plate, a knob engaging said dial-plate and having a stem adjustably engaging the sleeve, and a screw adjustably connecting said sleeve and knob-stem, substantially as described and for the purpose set forth.

WALTER B. HUMPHREY.

Witnesses:
FRED. J. DOLE,
FREDERICK A. BOLAND.